United States Patent [19]

Etani

[11] Patent Number: 4,853,131
[45] Date of Patent: * Aug. 1, 1989

[54] METHOD FOR WATER TREATMENT

[76] Inventor: Kenji Etani, P.O. Box 102, West Townsend, Mass. 01474

[ * ] Notice: The portion of the term of this patent subsequent to May 28, 2002 has been disclaimed.

[21] Appl. No.: 169,430

[22] Filed: Mar. 17, 1988

Related U.S. Application Data

[60] Division of Ser. No. 93,186, Sep. 4, 1987, Pat. No. 4,775,485, which is a division of Ser. No. 488,597, Apr. 22, 1983, Pat. No. 4,692,314, which is a continuation-in-part of Ser. No. 40,302, May 18, 1979, abandoned, which is a continuation-in-part of Ser. No. 934,425, Aug. 17, 1978, abandoned, which is a continuation of Ser. No. 717,514, Aug. 25, 1976, abandoned, which is a continuation-in-part of Ser. No. 591,536, Jun. 30, 1975, abandoned.

[51] Int. Cl.$^4$ .............................................. C02F 5/08
[52] U.S. Cl. ..................... 210/696; 210/749; 210/764; 239/310; 422/14; 422/265
[58] Field of Search ............... 4/538, 228; 137/268; 210/696–701, 749, 753–756, 764, 192, 198.1, 169; 239/310–318; 422/14–19, 264–266

[56] References Cited

U.S. PATENT DOCUMENTS

| | | | |
|---|---|---|---|
| 429,384 | 6/1890 | Hanwarnig | 422/265 |
| 2,543,075 | 2/1951 | Swain | 239/567 |
| 2,826,484 | 3/1958 | Buehler | 239/310 |
| 3,120,015 | 2/1964 | MacChesney | 239/266 |
| 3,633,538 | 1/1972 | Hoeflin | 206/0.5 |
| 3,677,408 | 7/1972 | Dinizo | 210/169 |
| 3,681,264 | 8/1972 | Prial | 210/925 |
| 3,684,460 | 8/1972 | Arneson | 422/265 |
| 3,706,140 | 12/1972 | Brillaud et al. | 422/265 |
| 3,846,078 | 11/1974 | Brett | 422/264 |
| 3,924,807 | 12/1975 | Morgan | 422/265 |
| 4,512,955 | 4/1985 | Etani | 239/310 |
| 4,519,914 | 5/1985 | Etani | 210/696 |
| 4,530,120 | 7/1985 | Etani | 210/765 |
| 4,692,314 | 9/1987 | Etani | 210/206 |

Primary Examiner—Peter Hruskoci
Attorney, Agent, or Firm—Gilbert L. Wells; Jack Larsen

[57] ABSTRACT

For water-treatment in swimming pools, cooling towers, hot tubs, and other systems, it is desired to feed various chemicals in small quantities but at optimum rates into the system. In several embodiments of the invention the water is recirculated through the system which usually includes a filter. It has been discovered that the chemicals can be fed by enclosing them in generally spherical plastic capsules suggestive of table tennis balls, but about the size of a base ball. The rate of feeding depends upon the size and number of small holes which are provided, or the user pokes through the shell of the capsule, upon the solubility of the chemical, and upon the flow rate of the water through a strainer, skimmer, or other chamber in the system into which the capsule is introduced. The random orientation of the capsule tends to average out variations. In other embodiments, the capsule is weighted to direct the small holes upward as it rests in quiet water, thereby substantially stopping the flow of chemical; but as the water is sloshed about in use, the chemical is dispensed at a rate proportional to the amount of use. Safety, convenience, and economy are among the asserted advantages. Invention is seen in the new use of such capsules for the purposes indicated.

15 Claims, 4 Drawing Sheets

METHOD FOR WATER TREATMENT

Cross-References to Relates Applications

The present application is a Division of application Ser. No. 07/093,186, filed Sept. 4, 1987, now U.S. Pat. No. 4,775,485 which is a division of application Ser. No. 488,597, filed Apr. 22, 1983, now U.S. Pat. No. 4,692,314 issued Sept. 8, 1987, which was a continuation-in-part of application Ser. No. 040,302, filed May 18 1979, now abandoned which in turn, is a continuation-in-part of application Ser. No. 934,425, filed Aug. 17, 1978, now abandoned, which is a continuation of application Ser. No. 717,514, filed Aug. 25, 1976, which is now abandoned and was a continuation-in-part of my application Ser. No. 591,536, filed June 30, 1975, and now abandoned.

BACKGROUND OF THE INVENTION

This invention relates to water quality and more particularly to methods and apparatus for feeding controlled amounts of chemicals such as chelating agents, perfumes, microbiocides and filtration aids to hot tubs, spas, cooling towers, swimming pools, and the like.

In home swimming pools, and in the newly popular hot tubs and spas it is almost always necessary to filter ad recirculate the water and to add certain chemicals such as organic flocculating agents which can greatly improve the effectiveness of filters in removing impurities.

Whether it be the chlorination or fluoridation of drinking water supplies, the addition of organic flocculants and alum, to improve the effectiveness of filters, or the addition of chelating agents to limit the formation of scale in boilers, it is known to provide apparatus known as a "feeder" to meter predetermined amounts of such chemicals into the water. This is done in large public and commercial systems; but the necessary capital investment for such equipment has been impractical for the operator of a home pool or small cooling tower. To make up for the lack of automatic equipment the users of such small systems have been obliged to forego their advantages of the chemicals or to maintain a veritable chemistry laboratory with bottles of chemicals, many of them corrosive or poisonous, and apparatus to measure and mix them.

SUMMARY OF THE INVENTION

The present invention in its various embodiments provides automatic controlled administration of chemicals without the expense of feeders, and provides for the safe handling of the chemicals by unskilled persons.

It has been discovered that many of the desired water treatment chemicals can be packaged and shipped enclosed in sealed plastic spheres of handy size. For use, one or more small holes are opened in the shell and the sphere with chemical enclosed is dropped into the water system. It has been further discovered that the motion of the water, and of the sphere in the water can produce the desired rate of chemical feeding.

The spheres come in three embodiments, namely: volumes of 0.1 to 24 cubic inches, greater than 24 cubic inches, and up to and including 35 cubic inches, and greater than 24 inches and up to and including 70 cubic inches.

In one embodiment, the capsule is used to add alum to the water of a backyard swimming pool. Dropped into the skimmer or strainer basket it introduces alum at a substantially constant rate proportional to the rate of flow and independent of the amount of undissolved alum remaining in the capsule. Although at any instant the dispensing rate from the capsule will depend upon the position of the tiny holes relative to the flow, the position effect is eliminated, on the average, because of the movement of the capsule. The invention may be perceived as providing an improved swimming pool. A pool with the feeder capsule is a better pool, cleaner, more economical, more easily maintained than pools of the prior art; but, although this may be its place legalistically in the framework of statutory classes of the patent law, only in this technical sense is there an improved swimming pool system. The invention seems better to fit the category of "new use" as a method of water treatment.

The problem of classification also creates problems of joinder of invention. It has been found that the new use has many embodiments, each a method of water treatment but somewhat different as to the structure of the capsule, the point of application, the chemical composition dispensed, and the system treated. Some of the above-mentioned copending parent applications relate to swimming pools and the like wherein the feeder capsule is placed in the skimmer basket or other "intermediate velocity chamber" and the chemical is extracted by the flow as water is pumped through the chamber, causing the capsule to move about and stir its contents.

The present application is directed particularly toward new uses of the invention with air washers, coolinq towers, spas and the like wherein the chemical is extracted by flow; but in a different kind of intermediate velocity chamber. This application further develops uses in which the feeder is weighted so that in conditions of no flow feeding is not just reduced but substantially cut off, and uses wherein the flow is generated by random sloshing around in use.

The primary object of the invention is to provide the means by which the advantages of water treatment chemicals can be made available in relatively small water systems.

Another object of the invention is to provide safe containers for the storage and shipment of dangerous water treatment chemicals and to provide child-proof containers for final consumer use, and a related object is to provide means for using these chemicals that are both simple and safe:

A further object is to provide means for meeting the utilitarian requirements of the use in a neat, orderly, and attractive way.

It has been found that the new use has many embodiments.

In swimming pools, in addition to alum for filtration, the method may be used to add flocculants, chelating agents, microbiocides, germicides, and pH adjusting chemicals by introducing appropriate capsules into the skimmer or strainer basket. A thin film of cetyl alcohol to limit evaporation, or a thin film of perfume oils may be maintained on the pool surface by floating a capsule in the pool that responds to the wave action of pool use to replenish the films.

In hot tubs and spas where the water of the tube is vigorously agitated by air and water jets, the chemicals may be administered by dropping the capsules (which, because of the tiny holes, are safe for body contact) directly into the tub with the bather. In most cases it will be preferred to treat via the skimmer or strainer basket which is present in typical American spas and hot tubs.

It has been found that if the capsule filled with dry chemical is placed in a closable intermediate velocity chamber with a lid such as a strainer basket or an intermediate velocity mixing chamber used with a lawn sprinkler disclosed herein, water automatically enters the capsule through its small feed hole or holes when the pump is in operation or when the water is turned on. This eliminates operations prior to use, i.e., removing the cap, immersing the capsule in the water for filling and replacing the cap. This phenomenon is due to the pressure difference inside the capsule and the surrounding water. The water dissolves the chemical in the capsule and the solution is dispensed.

Cooling towers and air washers are treated by addition of microbiocides for algae and bacteria, and chemicals for inhibiting corrosion and scale formation. In each case, a capsule is introduced into the water collecting basin, or into the strainer, or other chamber with sufficient depth, and the chemical is extracted by the flow.

The accummulation of fuel on the bilge water of power boats presents a serious fire hazard which is reduced by adding a capsule of nonionic emulsifier, which is released slowly as it rolls around when the craft is under way. Any fuel which may be present is dispersed in the bilge water with a reduction of both flammability and fire potential.

Small amounts of agricultural chemicals can be applied to lawns, trees, and shrubs using a garden hose connected through an "intermediate velocity chamber" designed to accept capsules, and also designed to dispense the chemicals into the flow.

For household plants, nutrients may be administered from a capsule dropped into an ordinary sprinkling can, the capsule being arranged to release the chemical only as the water is sloshed about.

BRIEF DESCRIPTION OF THE DRAWINGS

The invention, accordingly, lies in the new methods and the novel arrangements which include dispensing containers which are adapted to, and contribute to, the success of the methods. The invention in its various aspects will, therefore, in part be obvious and, in part, will be apprehended from the following specifications in conjunction with the annexed drawings, of which.

DESCRIPTION OF THE PREFERRED EMBODIMENTS

Figure 1:
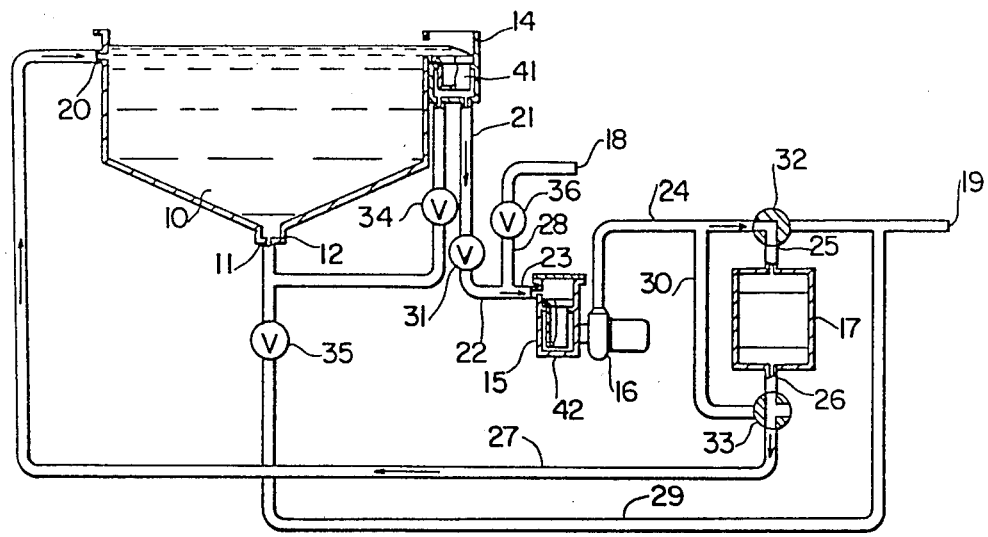
FIG. 1 is a schematic diagram of a typical home swimming pool system as used for the invention.

As indicated in FIG. 1, a typical swimming pool comprises a pool 10, which has a drain 11 and sump 12 at the bottom of the pool, a skimmer 14 which carries away overflow and collects floating debris, a strainer 15 at the inlet to a pump 16, a filter 17, a water main 18, source of fresh water, a system outlet 19, and a pool inlet 20. Pipes 21–30 and valves 31–36 connect all.

In normal operation, water is taken from the pool through the skimmer 14, the pipe 21, the valve 31, pipes 22 and 23, strainer 15, pump 16, pipe 24, valve 32, pipe 25, filter 17, pipe 26, valve 33, and pipe 27 back to the pool inlet 20. Valve 34 allows water to be recirculated in whole or in part from the bottom drain 11, and valve 35 allows water to be gravity-dumped through the pipe 29 to the system outlet 19. Valve 36 connects the main 18 to replenish through pipes 28 and 23. The valves 32 and 33 may be turned to backwash the filter 17 via the pipe 30. The skimmer 14 is arranged to collect leaves and other floating debris. To prevent the plugging of the pipes 21, 22, 23, and the pump 16, the skimmer 14 has a perforated basket 41 of larger diameter and the strainer 15 has a strainer basket 42. While the flow velocity in the baskets is much less than that in the pipes, it is still perceptible and non-uniform so that when a container of chemical of the kind shown in FIGS. 2 to 5 is dropped into the perforated basket in the skimmer or into the strainer basket it bobs or flutters with the flow through the baskets.

The dry chemical capsule is placed in the strainer basket with the feed hole or holes in upward position. When the pump is in operation and after the water enters the capsule through its small feed hole or holes, the chemical nearest to the hole or holes dissolves first and three layers form within the capsule, i.e., the pocket of entrapped air or gas at the top, the chemical solution in the middle, and the yet undissolved solid chemical in the bottom. When the pump is turned off and there is no water flow through the strainer chamber, the capsule is in repose with the feed hole side upward and the heavier solid downward. Chemical feeding into the system, except by diffusion, is stopped. When the pump is turned on, the capsule rolls with the water current and the solution is released through the feed hole or holes and is rapidly mixed with water. The yet undissolved chemical remains in the bottom of the capsule. The capsule delivers the chemical at substantially a constant rate until the amount of chemical is expended. When the chemical is nearly dispensed, the capsule becomes lighter and floats and spins in the strainer.

As mentioned above, the feeder may be inserted at these places or a special chamber. We may call these generically "intermediate velocity chambers" and they must have a cross-sectional area at least twice that of the feeder so the feeder does not obstruct the flow, and should not be greater than one hundred times the feeder cross-section, if there is to be a perceptible stream velocity.

Figure 2:
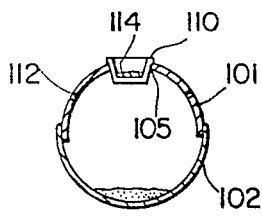
FIG. 2 is a drawing of a section through a form of the dispensing container of the invention, approaching depletion of the chemical.

FIG. 2 is representative of a practical embodiment for a dispensing container for coagulants, hereinafter termed a "feeder". The feeder comprises two plastic hemispheres 101, 102, which are joined together in the manner of some table tennis balls with cement. The hemisphere 101 has a filling hole 105, which is closed by a plug 110. For dispensing the chemical, there are a number of small holes 112 in the hemisphere 101. Plug 110 has a porous buoyant portion 114.

Figure 3:
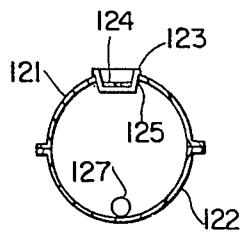
FIG. 3 is a drawing of an alternative construction of the container, as preferred in some uses, shown empty.

FIG. 3 represents a construction in which two hemispheres 121 and 122 are joined at a flange. The thermoplastic hemispheres with flanges can be made easily by the vacuum forming process. This is the preferred construction when polyvinyl chloride (PVC) is used, or when the filling chemical is compressed into a solid ball "brickette". The flange closure is readily achieved by ultrasonic welding, and the flange assists the rotation of the feeder in the eddies of flow. It also facilitates the handling and packaging of the feeders. The body of chemical, or an added weight 127 tends to stabilize the upward orientation of the feeder holes in conditions of low flow. A filling hole 125 is closed by a plug 123 which has a porous buoyant portion 124.

Figure 4:
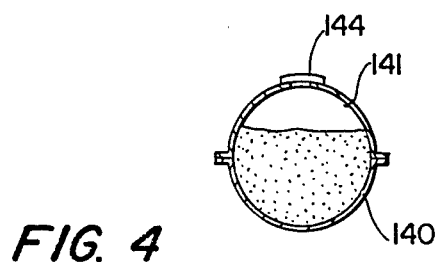
FIG. 4 is a drawing of a second alternative construction with a non-refillable closure.

FIG. 4 represents an alternate closure of the feeder of FIG. 3. In this construction the feeder is filled by the supplier with a desired quantity of chemical 140, leaving an empty space 141, and sealed with a patch 144. The empty space may be filled with inert gas for chemicals which may be degraded in the presence of air or moisture. With this construction, the user must make the proper number of dispensing holes by piercing the feeder with a needle or the like.

Figure 5:
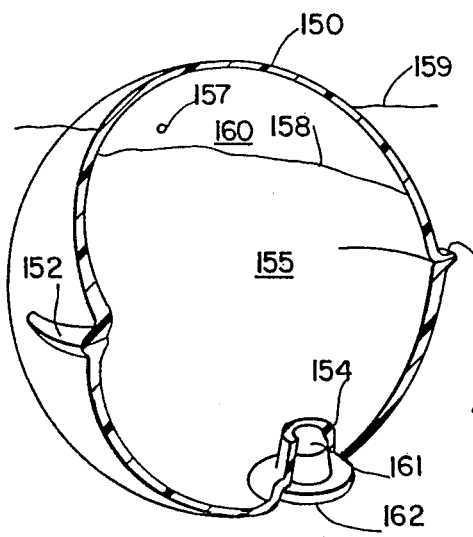
FIG. 5 is a cut-away view of the form of container preferred in most uses.

FIG. 5 is a cut-away drawing of the capsule configuration preferred for most swimming pool and spa uses. The sphere is blow-molded of high density polyethylene. Twenty-two grams of the polymer are needed for a sphere 2¾ inches in diameter. The shell 150 varies somewhat in thickness between about one-sixteenth and one-eighth of an inch. The mold is made in two parts. When molding is complete the sphere is left with a pair of stub wings 152 and 153 which serve the function of the flange in the configuration of FIG. 3.

In preparation for filling, the filling hole 154 formed in the mold is cleanly cut using an ultrasonic tool. The figure represents the capsule as filled with an emulsion 155 of perfume oil, mineral oil, isopropyl myristate and a spreading agent. It is desired that this capsule float with each dispensing hole 157 near the liquid level inside 158 and outside 159 the capsule when it is resting in still water. To achieve this result, an air space 160 is left after filling with the emulsion, and a zero gauge buck shot 161 is swaged into the filler plug 162.

As in the case of the composition just described, it is possible to dispense oil-soluble chemicals into water without creating an oily film on the water by means of the invention. The oil with dissolved chemical is added with emulsifying agent and some water to the capsule as above; but, sometimes, the emulsion tends to separate into three layers, i.e., oil at the top, emulsion in the middle, and water at the bottom. When this happens, it may be desirable to place the feed hole at the bottom of the capsule near the weight 161. When the capsule is violently agitated the emulsification is complete. When it is quiet enough for separation, both the oil and the flotation bubble are completely contained by an intervening layer of water between them and the dispensing hole or holes.

A dry granular chemical can also be introduced through the filling hole 154 into the shell 150, and then the plug 162 without weight 161 is welded over the hole. This makes the capsule child-proof prior to use. This is important from a practical point of view for swimming pool and spa and hot tub use, because it enables the packager to offer a completely sealed capsule for dry chemicals used in swimming pools and spas, some of which are hazardous chemicals, such as calcium hypochlorite (germicide), sodium bisulfate (for lowering pH) and sodium carbonate (for raising pH). During usage, the capsule installed in the strainer is less accessible to children because of the strainer's air-tight lid, than it is when placed in the skimmer. This arrangement is safe for bathers as well as for children.

Figure 6:
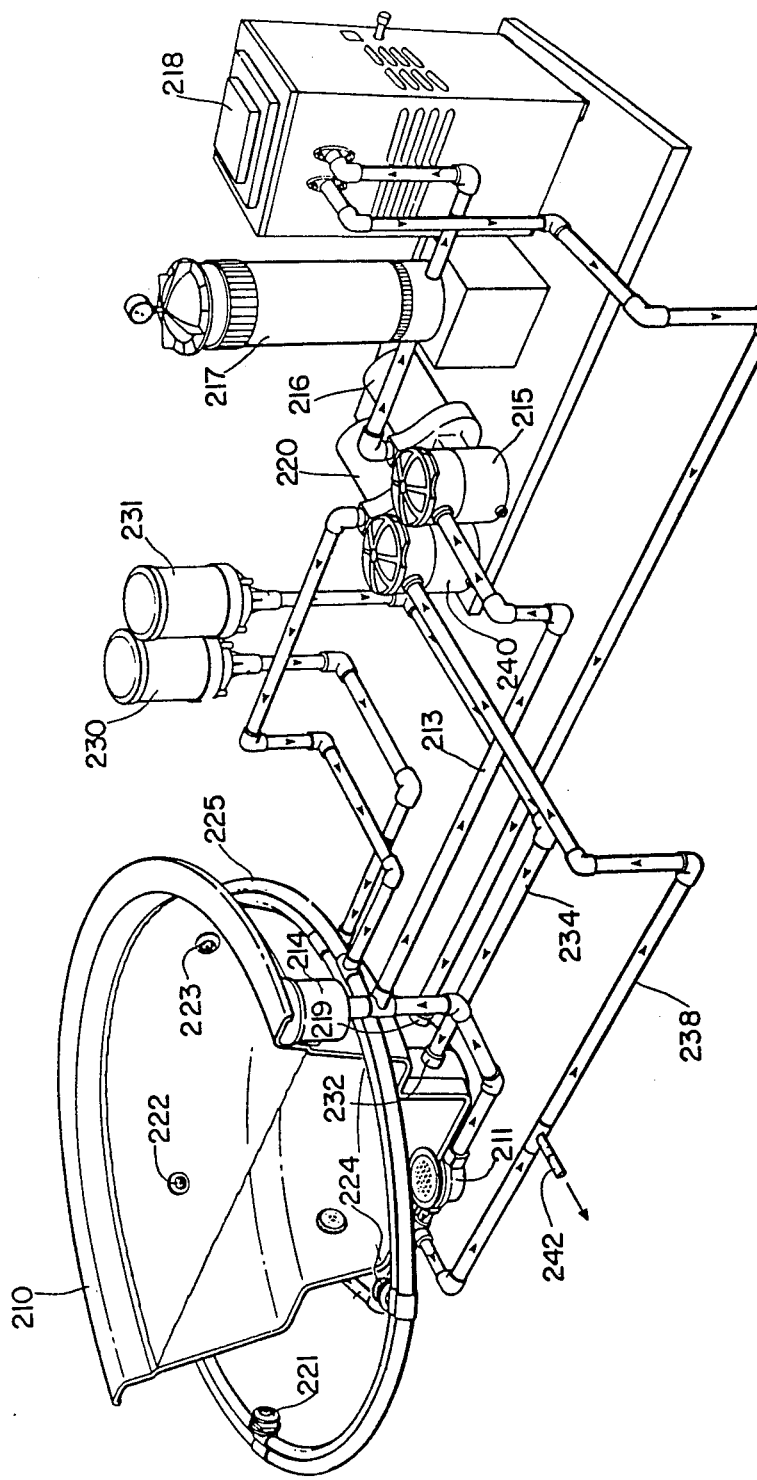
FIG. 6 is a schematic diagram of a typical home spa system as used for the invention.

FIG. 6 is a drawing representative of a so-called "spa" showing the features which characterize such systems. A descendant of Roman and Japanese baths, of the sauna, the therapeutic "whirlpool" bath, and hot springs, the spa provides a setting for communal bathing in warm water with the active stimulation of vigorous jets of water and air. The hot tub is a close relative of the spa, characterized by classical construction in the form of a large round wooden vat with a simple wooden bench. The spa, built up of concrete, tile, or fiberglass has more comfortable seating, and more flexible shape, seating arrangement, and plumbing. The spa of FIG. 6 has all of the common features but it must be understood that in the pleasure business taste is everything—so users may do without features, or add, as the spirit moves them. The system of FIG. 6 has a tub 210 which has a main drain 211 at the bottom. Water is returned through pipe 213 from the drain 211 and a skimmer 214 to a strainer 215, and a water pump 216. From the pump 216 the water goes through a filter 217, a water heater 218, and returns to the tub at inlet 219. A second pump 220 called a "booster pump" propels water forcefully from the jets 221-224 via the pipe 225. An air pump 230 feeds air to the water jets 221-224 in a ventury connection whereby a large quantity of air is entrained in the jets of water. A second air pump 231 is connected to an air jet 232 that blows air directly into the water in the tub by way of the pipe 234. Water is returned from the tub by way of return line 238 and a strainer 240 to the booster pump 220. Supply water may be added, and the system drained by the pipe 242.

The power of the air and water pumps amounts to about ten watts per liter and is sufficient to agitate the water thoroughly. As a result, a dispensing capsule of the type described above dispenses chemicals into a spa system whether dropped into the skimmer 214 or strainer basket 215 to respond to the flow produced by the filter pump 216 or into the tub 210 to be buffeted by the water jets from the booster pump 220.

It is the vigorous activity of the water that characterizes the spas and hot tubs, clearly distinguishing them from other baths and swimming pools. I have, therefore, adopted the term "dynamic bathing system" to be generic of spas, hot tubs, whirlpool baths, and the like, regardless of the means by which the agitation is achieved. I characterize a bath as a "dynamic bathing system" if the kinetic energy of the water exceeds three joules per liter, exclusive of course of the energy of translation, such as that imparted when the tub as a whole is carried in a vehicle.

The amount of kinetic energy can be estimated from the pumping power applied to the system and the time it takes to reach full turbulence after the power is turned on.

Spas have many water treatment problems in common with swimming pools. Capsules filled with flocculants, chelating agents, or microbiocides are preferably applied at the skimmer basket 214 but also may be dropped into the tub. The capsule filled with a hazardous dry chemical, such as calcium hypochlorite, should be placed in the strainer basket 215.

The activity of the water sometimes calls for a defoaming agent, since soap suds are not desired in a spa. A capsule of the kind shown in FIG. 5 and filled with a solution of defoaming agent may be placed in the skimmer basket or tub. Very little chemical is required and, thus, enough may be dispensed from a single small (0.026") hole and last for two weeks or more.

It has been said that because of the high water temperature, chlorine is inappropriate as a germicide in hot tubs and spas. Consequently a slow-dissolving Bromine Stick produced by Hydrotech Chemical Corporation, similar to a chlorine stick, is gaining popularity among hot tub and spa owners. The real reason that chlorine has been found to be inappropriate is that no workable chlorine feeder has thus far been developed. This invention enables the manufacturer to offer a feeder for such dry germicides which is not only workable but completely sealed prior to use. During use, the capsule installed in the strainer is less accessible particularly to children than it is when placed in the skimmer. Even when removed before chemical depletion, only a minute amount of chemical would ooze from the dispensing holes.

Perfume capsules of the kind illustrated in FIG. 5 are desired for spas, and for them the desired point of application is the tub itself. The perfume oils tend to separate from the water but the motion of the capsule with the emulsifying agent and isopropyl myristate breaks it down into droplets small enough to escape the capsule. The spreading agent has a molecule which at one end attaches to the water and, at the other end, attaches to the oil, thereby tending to spread the oil in a thin film. One small hole has been found to provide a sufficient rate of feeding.

Figure 7:
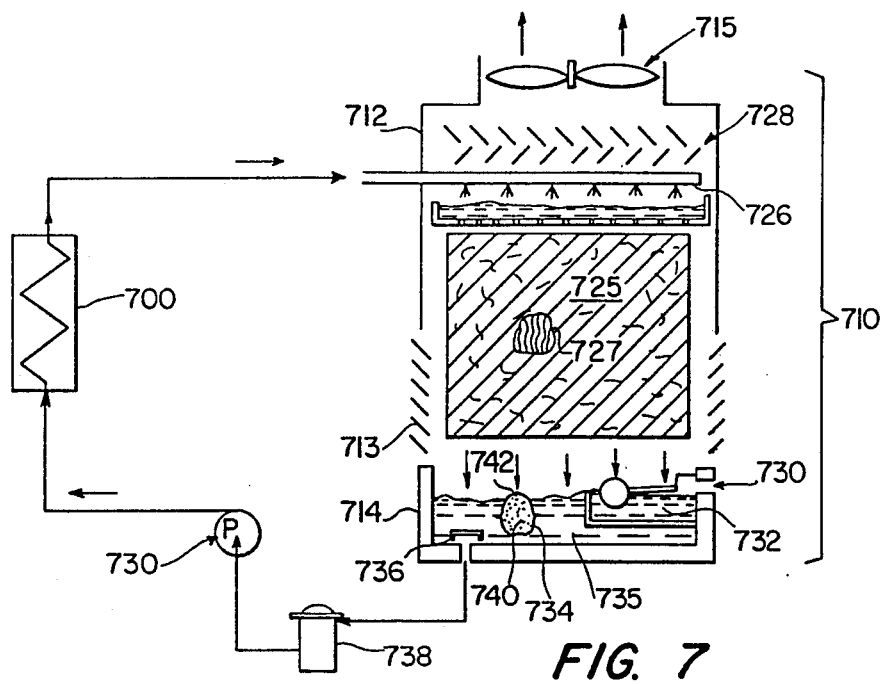
FIG. 7 is a schematic diagram of a typical cooling tower system as used for the invention.

Reference is now made to FIG. 7 which illustrates a typical cooling tower loop in an open recirculating system. The cooling tower is a very effective device for interacting air and water. In a cooling tower the water gives up its heat in part by conduction and in part by evaporation. The air also gives up to the water, dirt and bacteria, spores, and slimes. Water comes from a closed heat exchanger 700 usually inside a building and is delivered to the cooling tower 710 usually situated on the roof. It has an enclosure 712 which at the sides is made up largely of louvers 713 tilted to admit air an return spray to the inside. At the bottom is a collecting basin 714 and at the top there may be a fan 715 to accelerate the flow of air through the tower. Most of the interior space is occupied by what is termed the "fill" 725, or "wet deck structure". What the fill is made of depends upon a number of chemical and economic factors. If the tower is on the ground it may be heavier than if the tower is atop a skyscraper. Whatever the construction, the function is the same. The water that enters at the top is distributed across the top of the fill by a distribution system 726. From there it is desired that the water descend in laminar flow spread out in thin sheets flowing over the fill, exposed all the way to a countercurrent of air, which must be free to flow up through the fill 725 and the distribution system 726. Ribbed plastic sheets 727 (shown in a cut-out) sometimes form the fill. In this form of tower, it is desired that the water present maximum area to the air, but as film not droplets. There is, however, some unavoidable droplet formation and to recapture these, drift eliminators 728 are placed at the top. There is, however, some considerable loss of water by evaporation. It is convenient to control the addition of make up water supplied at 730 by means of a float valve 732 situated in the collecting basin 714. The collecting basin is one of the places suitable to receive a water treatment capsule 734 in an embodiment of the present invention, shown free to move about in the body 735 of water. From the basin water passes through the drain 736 to a strainer 738, a possible point for insertion of a dry chemical capsule, then to a pump 730, and then back to the heat exchanger.

Whatever the construction of the fill it is the closest to heaven that slimes and algae, and some bacteria, can ever know, i.e., warm and moist, and dark with a constant stream of goodies arriving by air and water. It has been found that a cooling tower for air conditioning provides a breeding ground for the rare and deadly bacteria of "Legionaires' Disease". Unattended, algae and slime soon clog the fill or the heat exchanger and piping. The accumulation of mineral scale is another problem to be avoided by water treatment. There is an established business wherein trained water-quality technicians travel from plant to plant to test cooling tower water and add appropriate chemicals. The cost of this service is, however, uneconomic for small towers such as those of air conditioners in the under one hundred ton range of air conditioning systems often found in supermarkets and the like. Using the capsules and methods of this invention it is practical to treat these small systems. The relatively unskilled store personnel may be entrusted to add capsules every week according to a professionally prepared plan.

A very close relative to the cooling tower is the "air scrubber". In an air scrubber there is a distribution system, a working volume (which may be either a fill or a spray chamber) where air and water come together with a large area of contact, and a collecting basin as for the cooling tower. By the interacting flows of air and water, the air is cooled, purified, and humidified then returned to sustain animal life or a process requiring clean air. Alternatively dirty process air may be scrubbed before release to the atmosphere to comply with environmental regulations. Scrubbers have many of the same water treatment problems as cooling towers, and this invention provides similar solutions. For lack of a better generic term, scrubbers and cooling towers may be together termed "air-water interfacers". The water treatment for air-water interfacers calls for larger treatment capsules. It is desired to lengthen the maintenance cycle, and the collecting basin typically might accommodate a sphere six inches in diameter or larger.

It has been found that making the sphere larger also requires making it thicker, and if safety in shipment is to be preserved, molding becomes more expensive, and so on. It has been found that in the present state of the art the cost per pound of chemical encapsulated for the present invention is minimized at a capsule diameter of about 4 inches. In this case, the "large economy size" is not necessarily cheaper.

With the development of automatic filling and packaging machinery for the somewhat smaller capsule desired for swimming pools and hot tubs, it is unlikely that capsules for airwater interfacers will be larger than four inches in diameter. But it is desired to enclose a maximum weight of water-soluble chemical within the available diameter. Accordingly, the optimum arrangement for cooling tower scale and corrosion inhibitors and microbiocidesis a bricketted ball 740 of solid chemical three inches in diameter, enclosed between flanged hemispheres, as shown in FIG. 7, three and one-half inches in diameter. The hemispheres are formed with dimples 742 formed as the filling hole 154 in FIG. 5 to center the brickette and cushion it in shipment. To extend the time between additions of chemicals, an increased number of capsules, each with a fewer number of dispensing holes, or smaller dispensing holes, is added rather than a larger capsule.

At the other end of the size spectrum is another form of air-water interfacer—the residential drum humidifier. In these devices a cylinder (or belt) of porous construction is rotated slowly about a horizontal axis, dipping into water in a tray at the bottom. As the wet cylinder rotates, air passes through it radially, whereby the air is washed and humidified. Such humidifiers may be portable or built-in but all have problems of slime formation and scale accumulation, which the householder finds so distasteful that the relatively high cost of capsules of 25 ml capacity or less, as required to fit the small space available in some pans, is accepted as a small price to pay for reducing slime and scale to manageable residue in the pan.

Figure 8:
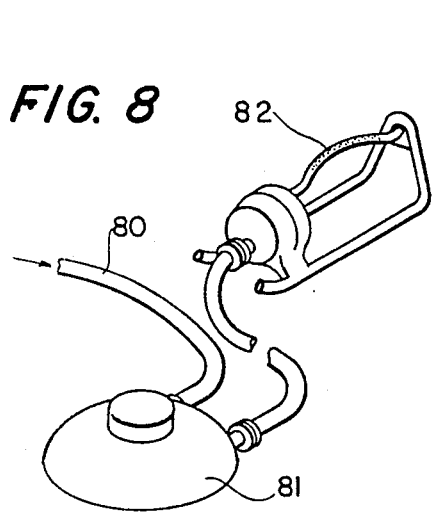
FIG. 8 is a drawing of a lawn sprinkler arranged for the invention.
Figure 9:
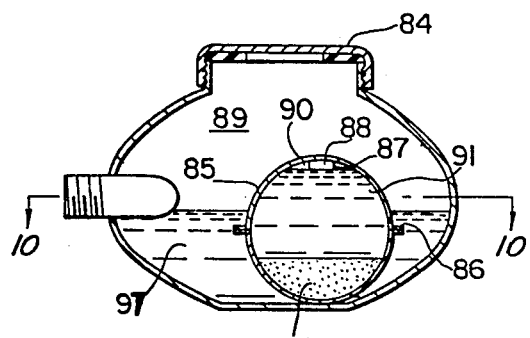
FIG. 9 is a drawing partly in section, along lines 9—9 and 9'—9' of FIG. 10.
Figure 10:
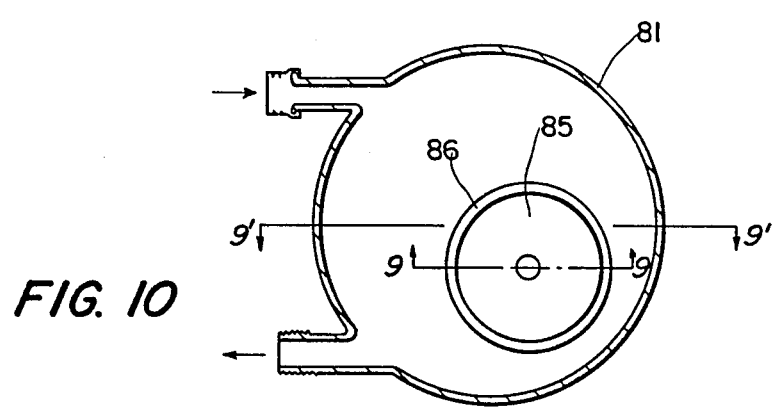
FIG. 10 is a plan view, partly in section of the chamber of FIG. 9.

FIG. 8 illustrates another use of the invention. Water from a garden hose 80 is directed through an intermediate velocity mixing chamber 81 and onto a water sprinkler 82. As shown in FIG. 9, the chamber 81 has a screw top 84, and contains a water-treatment feeder capsule 85 also shown in FIG. 10 with room enough to roll around in the chamber as the water runs.

The capsule 85 is made of two hemispheres, preferably fastened together by ultrasonic welding forming a flange 86. One hemisphere is provided with a dimple 87. The bottom of this dimple is thinned because of the nature of the vacuum forming process used to produce the hemispheres. A feed hole 88 is conveniently pierced at that point. A dry chemical is introduced into the capsule before the halves are welded together preferably by bricketting the chemical to fit the lower hemisphere. This makes the capsule relatively child-proof prior to use. When the water is turned on, it enters the capsule through the pierced hole or holes. After water 97 enters the container, the chemical nearest to the pierced dimple 87 dissolves first and three layers are formed within the capsule, i.e., the pocket 90 of entrapped air around the recess, the chemical solution 91 in the middle, and the yet undissolved solid chemical 92 on the bottom. When the water is turned off and there is no flow through the chamber 81, the capsule is in repose with the lighter dimpled side upward and the heavier solid chemical side down. Chemical feeding into the system except by diffusion is virtually stopped. When the water is turned on the capsule rolls with the current and the solution is released through the feed hole or holes and rapidly mixes with the water to the sprinkler. The yet undissolved chemical remains in the bottom of the capsule. In this case it may sometimes be desired to release a chemical at a rate so great that the solution 91 becomes substantially less than saturated. The feed rate then becomes dependent upon the exposed area of the chemical. Fortunately the stability is greatest when the area is greatest, and least when the area is least so that the feed rate tends to remain constant, even though saturation is not complete.

The chamber may be provided with back-siphonage, backflow preventer (not shown), such as Watts No. 8 made by Watts Regulator Co., Lawrence, Mass. (U.S. Pat. No. 3,171,423), to maintain the water inside at a certain level as illustrated in FIG. 9 for a prolonged period of time after the flow has stopped. The feeding is stopped completely since the feed hole is exposed in air space 89 above the liquid level inside and outside the capsule.

Figure 11:
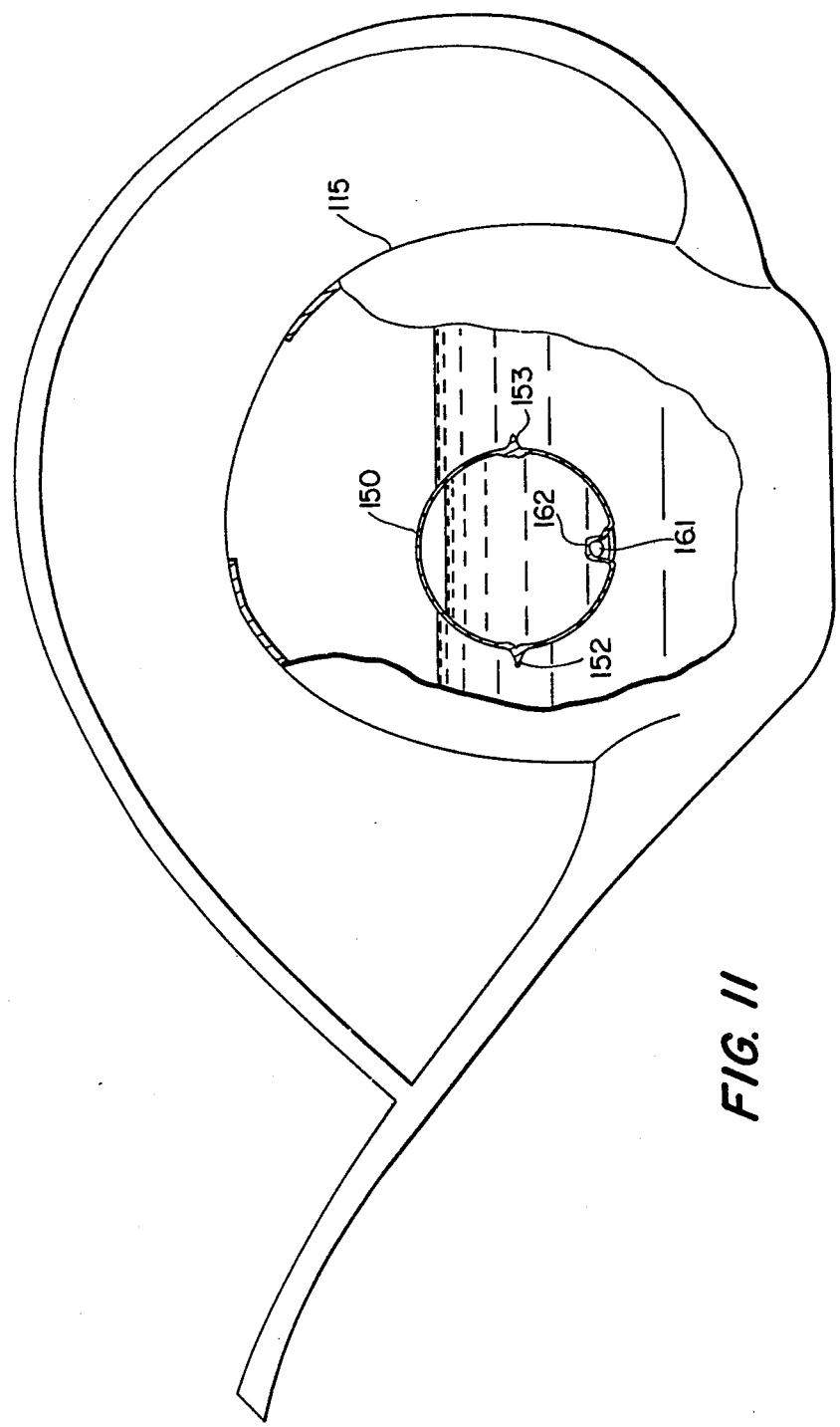
FIG. 11 illustrates use of the invention using a horticulturist's watering can.

FIG. 11 represents the use of the invention to supply chemicals which are needed in minute amounts by plants under the care of a horticulturist and watered by hand. It may be preferable to use a spouted container 115 made of chemically inactive plastic.

In this case, the capsule 150 used is the same as that preferred for the use as shown in FIG. 5. It becomes especially important that the capsule have the wings 152, 153 so that angular motion results in tilting of the capsule 150. There is considerable feeding of chemical into the water when the can is filled at the faucet (not shown), and additional feeding as the sprinkler is used. There is, therefore, proportionality to the number of plants, the number of waterings, and the amount of water used. Considering the wide range between the necessary and tolerable concentration of micronutrients and the like, the method provides a happy compromise between ignoring the need, and making it a fetish.

The feed holes are "small holes". They are not mere pores easily clogged. For definiteness, the range is less than 3 square mm in area, but greater than 0.005 inches n diameter.

Having thus described the methods and apparatus of the invention, a catalog of capsules and chemicals may be pertinent:

Type A. PVC or blow-molded, high-density polyethylene, 2.75" in diameter filled with alum and a small proportion of ultra high-molecular weight flocculant "MAGNIFLOC 985N", made by American Cyanamid, or filled with dry chemical such as sodium bisulfate or sodium carbonate, one to four feed holes 0.026", for use in swimming pool strainer or skimmer baskets.

Type B. Blow-molded, high-density polyethylene capsule filled with low-molecular weight liquid cationic polymer flocculant solution, "MAGNIFLOC 572", made by American Cyanamid. Two or three feed holes 0.026" for use in swimming pool skimmer baskets or spas. Capsules of 2.75" and 2.0" diameters are for pool and spa, respectively. This is deemed to be the preferred embodiment of the invention.

Type C. PVC or blow-molded, high-density polyethylene, 2.75", 2.0", or 1.5" diameter capsule filled with nitrilotriacetate, NTA, and ethylenediaminetetraacetate, EDTA, made by W. R. Grace and Co., or filled with polyacrylate polymers such as "CYANAMER P-70" (anionic polyacrylamide) made by American Cyanamid. The chelating agents and antiscalant inactivate scale and scum-causing metallic ions, such as calcium and magnesium. Placed in a strainer or skimmer basket of a pool or spa, the chemical treats first the piping, heater and pumps where most needed. The smallest capsule filled with P-70 is used in small air washers and humidifiers as an antiscalant.

Type D. Microbiocide. Like all capsules, unless otherwise specified, 2.75" diameter of blow-molded, high-density polyethylene, filled with 30–60% concentrations of microbiocide, poly[oxyethylene(dimethylimini-o)ethylene (dimethyliminio) ethylenedichloride] made by Buckman Laboratories. Applied to a skimmer basket of a pool or spa, or sump of a cooling tower to control algae. Smaller capsule, 1.5" diameter, is used for algae, bacteria, and fungi control in air washers and humidifiers. Small feed holes, up to 0.1% of feeder surface aggregate area.

Type E. Evaporation retarder and heat retainer. Blowmolded high-density polyethylene. Contains a dispersion of cetyl alcohol in water which spreads to form a molecular layer over the water. Weighted, it is placed in a pool, tub, or skimmer basket, dispensing a small quantity of the chemical whenever the surface is disturbed. Reduces humidity problems and heating costs for indoor pools.

Type F. Defoaming. Blow-molded polyethylene 2" diameter capsule filled with 10% active concentration of defoaming agent such as FG-10 (Food grade) emulsion antifoam made by Dow Corning Company. Placed in a skimmer basket or tub of a dynamic bathing system, it suppresses the formation of suds.

Type G. Germicide. Blow-molded polyethylene feeder contains germicide for dynamic bathing system and swimming pool systems, filled with dry chlorine chemical, for example calcium hypochlorite, lithium hypochlorite, trichloro-s-triazinetrione, sodium dichloroisocyanurate or potassium dichloroisocyanurate to feed into the water of a strainer in a swimming pool or spa or hot tub.

Type H. Microbiocide. Blow-molded polyethylene filled with 30% active ingredients, 15% sodium dimethyldithiocarbamate and 15% "NABAM" made by Alco Chemical Co. For cooling towers and the like.

Type I. Stain and scale controller. Blow-molded polyethylene capsule filled with "DEQUEST 2010" phosphonate(1-hydroxyethylidene-1, 1-diphosphonicac made by Monsanto Chemical Company. Placed in a skimmer in a swimming pool or spa or hot tub.

Type J. Scale and corrosion inhibitors. Blow-molded, high-density polyethylene 2¾ or 3½ inches in diameter. Filled with a blend of phosphonates and triazoles, non-ferrous metal corrosion inhibitors. Placed in sump of cooling tower or the like.

Type K. For scale and corrosion in general service water. PVC 3½ inch diameter filled with ball brickette of 3" diameter, NALCO 936, a blend of polyphosphates and polyvalent ions. Placed in cooling tower collecting basin and the like.

Type L. For lawnsprinkler. PVC 3½ inch diameter or high-density polyethylene 2¾ inch diameter filled with either brickette or solid garden chemicals such as fungicides, herbicides, insecticides, wetting agents, fertilizers; and micronutrients such as chelated iron, manganese, copper, and zinc. Feed hole size may be as much as 0.2% of feeder surface.

Type M. For marine bilges. Blow-molded polyethylene feeder containing a nonionic surfactant such as produced by Sudbury Laboratories, Sudbury, Massachusetts. The rate of feeding increases with the amount of rolling and pitching of the craft. It does not replenish the emulsifier when the bilge is pumped out.

Type N. For nurseries. A weighted feeder of blow-molded high-density polyethylene, contains a solution of 7-12-6 fertilizer fortified with micronutrients iron, zinc, manganese, copper, boron, magnesium, and molybdenum. The solution has a color which indicates depletion. Placed in a watering can, the feeder rests with feed holes up when not in use. Chemical is added when the water is disturbed. When the chemical is depleted, the feeder floats to the water surface.

Type P. Perfume. Blow-molded polyethylene filled with emulsion of perfume oil, mineral oil, isopropyl myristate, and a spreading agent such as a polyoxyethylene polyol fatty acid ester. Weighted, and with air for floatation, the feeder spreads perfume on the surface of a pool or tub only when in use.

Type Q. Coloration. Blow-molded polyethylene feeder filled with a solution of FDA-approved food color to tint the water of a dynamic bathing system blue or blue-green. Because the chlorine and bromine in the system gradually bleach out the color, it needs to be gradually made up by a feeder in the tub or skimmer basket.

Type R. Repellant. Similar to the Type P perfume feeder, this feeder is floated on an outdoor swimming pool to spread a molecular layer of insect repellant across the water surface in proportion to wave action, which approximates the need.

Type S. For slimes and algae. Blow-molded polyethylene, 2.75", 2.0", or 1.5" diameter capsule filled with simazine, 2-chloro-4,6-bis(ethylamino)-s-triazine made by CIBA-GEIGY Corporation, for cooling towers, fish ponds, and aquariums, etc.

In the prior art it is known to place a fluid-treatment chemical in a container with holes small enough to keep a solid chemical inside, while allowing the fluid to pass through freely. The common tea bag is an example, as the spherical capsule and system shown in U.S. Pat. No. 2,543,075, or the plastic capsule of U.S. Pat. No. 3,633,538. It is also known for various kinds of feeders to float around in a swimming pool to dispense chlorine from solid chemical. U.S. Pat. No. 2,826,484, to Buehler, is an example, as is Canadian Patent No. 612,268, to MacMahon. MacMahon discloses a structure wherein there are two relatively small holes into the dispensing capsule, one at the bottom from which saturated solution feeds out driven by its increased density. The Buehler patent contemplates a similar mechanism and suggests a substantial total area of dispensing holes, as is required for chlorine.

U.S. Pat. Nos. 2,543,075 (Friedrich), and 3,120,015 (MacChesney), disclose methods of feeding chemicals by interposing a chamber in a hose line.

Only in the patent to MacMahon is the size of the feed holes important. The smallest port diameter tested by MacMahon was two millimeters.

The present invention in all its embodiments involves a dispensing capsule that feeds chemicals from one or more relatively small holes; and the rate of feeding at any instant depends upon the directions the feed holes are pointing relative to the surrounding flow and gravity. These directions change as the feeders are used, because of the construction of the feeder and the place of application in the system, and the random changing of the directions creates new results not found in the prior art. Although a substantially spherical shape is preferred for the capsules, and the spherical shape has advantages in withstanding pressure between the inside of the capsule and the surrounding water in a strainer chamber, in less water flow resistance around its surface and in shipping and handling, contributing to the practical value of the invention, there can be a departure from spherical without leaving the scope of the invention. Eggshaped might be good, as bird eggs, with porous shells and countless tiny holes, are part of the prior art. In theory and in function, some chemical will be dispensed whatever the size of the capsules or the size of the holes, but this invention relates more to useful arts than to science. The invention derives its value not from "gee whiz!" performance but from simple, practical, economical, and safe solutions to water treatment problems. Because the steps of the new methods are simple and ambiguous,. because the structures are known and simple, and the chemicals are employed for known effects, there is the possibility that language broad and general enough to define the invention in all its embodiments would also read on processes on a scale larger or smaller and presently unknown to me. I have, therefore, determined practical limits on the size of the feeder capsules, and practical operable ranges for the hydrodynamics of the several systems as a basis for the appended claims. It is not suggested that these limits are critical or absolute, or that the invention would be inoperable outside of these ranges. The limits are based upon present and foreseen costs and available technology. In any case, the feeder is perforated by a number and size of small holes to provide the desired rate of feeding and is large enough to contain the dose of chemical.

As pointed out above, the invention is not for large quantities of chemicals, nor is it for very small amounts where the cost of packaging would exceed the value of the chemicals saved. The practical minimum size feeder is in the range of half a cubic inch to 1.5 inch diameter. For swimming pools and dynamic bathing systems, the maximum practical size is about 4 inches diameter or 35 cubic inches. At first, feeders the size of table-tennis balls were tried. Then it was felt that 24 cubic inches would be large enough for swimming pools, but it has been found that it is economic and practical to use larger sizes. Feeders of 70 cubic-inch volume are appropriate and have been used for larger municipal swimming pools. For cooling towers, the present optimum size is dictated by the availability of 3-inch-diameter ball-brickettes for which 35 cubic inches is sufficient. A capsule having a volume of 70 cubic inches has been used in cooling towers for adding a microbiocide and scale/corrosion inhibitors.

A diameter of 2¾ inches is preferred for capsule types A, B, C, D, E, G, H, I, J, L, M, N, P, R and S. 3½ to 4 inch diameter is preferred for types H, J, K, L and M. A 2 inch diameter is preferred for B, C, E, F, G, I, N, P, Q and S. An 1½ inch diameter is preferred for C, D and S.

The preferred feed hole size is about 0.026" for all types except Type L, where a larger hole may be desired.

Feed holes as small as 0.005" and as large as three square millimeters are considered to fall within the invention.

For types D, H. J, K and S, in air-water interfacer service, the feed holes may aggregate as much as 0.1% of capsule area within the invention, so also for Type L. For others, the aggregate area will not exceed 0.02% of the surface area.

The required number of feed holes depends upon flow rate and the size of the system being treated and is usually between one and five, with twenty-five selected as an upper limit, unless the number is multiplied by using a screen or mesh.

In every embodiment of the invention, the rate of chemical feeding is substantially reduced, or cut off completely when the system is not in use. This distinguishes the invention from the addition of chlorine from capsules that quietly float around in a swimming pool. Agitation or some intermediate velocity of flow stimulates the feeding. The invention is also to be distinguished from the above-mentioned patents to MacChesney and Friedrich where the chemical is interposed directly in a high-velocity stream, and wherein the capsule has no room to roll about to change its orientation.

The concept of an "intermediate-velocity chamber" has been useful in describing the method of feeder operation. The term is generic to the skimmer basket, the pump strainer, or a chamber associated with a filter in the systems of FIGS. 1 and 6, or to the pump strainer or collecting basin of FIG. 7, or to the Chamber 81 of FIG. 8, and to any other chamber which might be introduced for the purpose which is large enough to accomodate the feeders without substantial blockage of the flow and which, nevertheless, is small enough in cross-section so that the flow velocity is sufficient to cause the feeder to roll, or bob, or flutter with the flow. For definiteness the chamber size might be specified as bearing a relationship to the size of the feeder. In the foregoing examples the flow is a flow through the chamber and depends on the flow rate and the size of the chamber. But it is not the flow through the chamber that is important, but the flow impinging on the feeder. The tub in a dynamic bathing system falls within the definition of an intermediate velocity chamber even if the turbulence is created primarily by the injected air. Similarly, the sprinkling can of FIG. 11 is an intermediate velocity chamber when water tumbles in from a tap, or as it is sloshed about in use. At those times the flow is sufficient to roll the ball into dispensing attitudes.

The term "tank" is adopted as generic for the large receptacles for water, including the tub, the pool, and the basin.

What I claim is:

1. A process for adding chemicals to water comprising the steps of:
    (1st.) providing a feeder in the form of a stiff waterproof shell perforated by a number less than 26 of holes each greater than five thousandths of an inch (0.005") in diameter and less than three square millimeters in cross section, containing a dose of a chemical having said number of and size of said holes to provide a desired rate of feeding of said dose,
    (2nd) placing said feeder so as to be free to move about and roll within an intermediate-velocity chamber, and
    (3rd) impinging the water over said feeder in said chamber at a rate to provide a flow at an appropriate intermediate-flow velocity in said chamber, thereby to extract said dose at a substantially uniform rate into said water,
    (a) said feeder being small enough and close enough to spherical in shape and to neutral buoyancy depending on the said flow velocity that it is free to move about and roll in said water when impinged upon by said flow, and
    (b) said chemical is of the group consisting of nutrients, fungicides, herbicides, insecticides, microbiocides, germicides, corrosion inhibitors, scale inhibitors, dispersants, and defoamers,
    (c) wherein an effective amount of said chemical is added to treat said water.

2. The process as defined by claim 1, wherein said feeder comprises a plastic shell having a volume between 0.1 and 24 cubic inches, and having an aggregate area of said holes less than 0.02% of the surface area of said feeder.

3. The process as defined by claim 1 wherein said feeder is of volume between 0.1 and 24 cubic inches, and has an aggregate area of said holes less and 0.02% of the surface area of said feeder.

4. The process as defined by claim 3 wherein said feeder comprises:
- a seamless shell, substantially spherical, blown of thermoplastic material, perforated by said number of holes,
- having at one pole of an imaginary sphere approximating said shell, an indented filling hole formed in said shell, with a substantially cylindrical sidewall normal to the surface of said shell, for filling with said dose of chemical,
- and having on the equator of said sphere a pair of diametrically opposed stub wings integral with said shell and lying in the equatorial plane thereof, to assist said feeder to to move about and roll within said chamber.

5. The process for adding chemicals to water within a container comprising the steps of:
- (1st.) providing a feeder in the form of a stiff waterproof shell perforated by a number less than 26 of holes each greater than five thousandths of an inch (0.005") in diameter and less than three square millimeters in cross section, containing a dose of a chemical having said number of, and the size and situation of said holes determining a desired rate of feeding of said chemical in a dispensing mode of operation but said feeder being so weighted and buoyed that when placed in still water, it reposes so that there is substantially no outflow of said chemical in that mode of operation,
- (2nd) placing said feeder so as to be free to move about and roll within said container, and
- (3rd) imparting motion to said water to impinge against said feeder with sufficient force to disturb its equilibrium, causing it to move about and roll, thereby to extract said chemical at a proportional rate into said water said feeder being small enough and close enough to spherical in shape and buoyant enough that the velocity imparted by said motion is sufficient to cause said feeder to roll and move about in said container to add an effective amount of said chemical to the body of water within said container to treat said water.

6. The process of claim 5 wherein said chemical is of the group consisting of nutrients, fungicides, herbicides, insecticides, perfumes, insect repellants, germicides, evaporation retarders, spreading agents, and dyes.

7. The process of claim 5 wherein said container is a motorboat bilge, and said chemical is a surfactant to emulsify spilled fuel.

8. The process as defined by claim 7 wherein said feeder is of a volume between 0.1 and 24 cubic inches, and has an aggregate area of said holes less than 0.02% of the surface area of said feeder.

9. A process for adding chemicals to water comprising the steps of:
- (1st) providing a feeder in the form of a stiff waterproof shell perforated by a number less than 26 of holes each greater than five thousandths of an inch (0.005") in diameter and less than three square millimeters in cross section, containing a dose of a chemical, having said number of and size of said holes to provide a desired rate of feeding of said dose in a first mode of operation, said feeder being also so weighted and buoyed that when placed in still water, in a second mode of operation it reposes so that there is substantially no outflow of said chemical,
- (2nd) placing said feeder so as to be free to move about and roll within said container, and
- (3rd) impinging said water against said feeder with sufficient velocity to disturb its equilibrium, causing it to move about and roll, thereby to extract said dose at a proportional rate into said water, said feeder being small enough and close enough to spherical in shape and to neutral buoyancy that said velocity is sufficient to cause said feeder to roll and move about in said container to add an effective amount of said chemical to the body of water in said container to treat said water.

10. The process of claim 9 wherein said chemical is of the group consisting of nutrients, fungicides, herbicides, insecticides, perfumes, insect repellents, germicides, evaporation retarders, spreading agents and dyes.

11. The process as defined by claim 10 wherein said feeder is of a volume between 0.1 and 24 cubic inches, and has an aggregate area of said holes less than 0.02% of the surface area of said feeder.

12. The process of claim 9 wherein said chemical is an immiscible liquid lighter than water, and any feed holes are at the weighted bottom of said feeder.

13. The process as defined by claim 12 wherein said feeder is of a volume between 0.1 and 24 cubic inches, and has an aggregate area of said holes less than 0.02% of the surface area of said feeder.

14. The process of claim 9 wherein said chemical is a perfume oil and there is a single feed hole at the bottom of said feeder which is there weighted with a shot.

15. The process of claim 9 wherein said feeder is of a volume between 0.1 and 24 cubic inches, and has an aggregate area of said holes less than 0.02% of the surface area of said feeder.

* * * * *